United States Patent

Mankovitz

[15] 3,648,075
[45] Mar. 7, 1972

[54] ZERO VOLTAGE SWITCHING AC RELAY CIRCUIT

[72] Inventor: Roy J. Mankovitz, Tarzana, Calif.
[73] Assignee: Teledyne, Inc., Los Angeles, Calif.
[22] Filed: June 1, 1970
[21] Appl. No.: 42,383

[52] U.S. Cl. ................................307/252 B, 307/252 UA
[51] Int. Cl. ...................................................H03k 17/00
[58] Field of Search ...............317/11 A, 148.5 B; 307/133, 307/252 UA

[56] References Cited

UNITED STATES PATENTS

| 3,381,226 | 4/1968 | Jones et al. | 307/252 UA |
| 3,486,042 | 12/1969 | Watrous | 307/252 UA |
| 3,443,204 | 5/1969 | Baker | 323/24 |

*Primary Examiner*—L. T. Hix
*Attorney*—Ronald W. Reagin, Stephen L. King and Kenneth W. Mateer

[57] ABSTRACT

An AC relay circuit is disclosed which includes a triac as its active switch element. A full wave rectifier is connected between one of the primary terminals and the gate terminal of the triac. A control switch is provided between the load terminals of the rectifier. First control means are provided which are responsive to an input control signal for closing the control switch, thereby triggering the triac into conduction. Second control means are provided for rendering the control switch nonresponsive to the first control means whenever the magnitude of the AC voltage to be controlled exceeds a predetermined value.

10 Claims, 1 Drawing Figure

Patented March 7, 1972
3,648,075
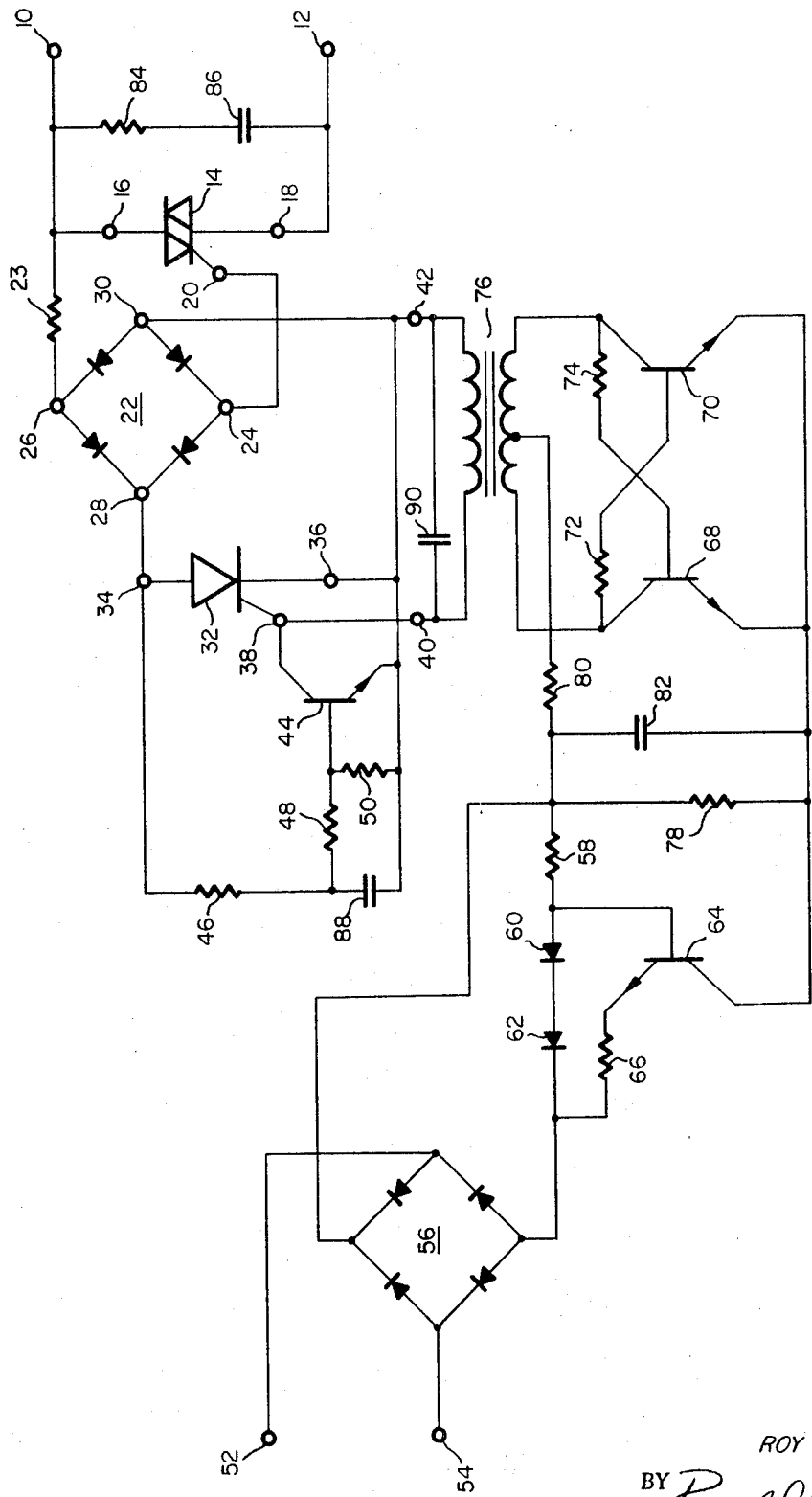
INVENTOR.
ROY J. MANKOVITZ
BY
*Ronald W. Reagin*
ATTORNEY

ZERO VOLTAGE SWITCHING AC RELAY CIRCUIT

This invention relates to relay circuits and more particularly to a relay circuit for controlling an AC voltage which utilizes a triac as the active switch element and which includes means for triggering the triac into conduction only when the value of the AC voltage being controlled is substantially equal to zero.

There is a type of semiconductor control switch called a triac which is triggered into conduction by a gate signal in a manner similar to the action of the well-known silicon-controlled rectifier. However, the triac differs from the conventional silicon-controlled rectifier in that it can conduct current in both directions of current flow in response to either a positive or a negative gate signal. Such a triac is described in U.S. Pat No. 3,275,909. Because of these unique characteristics, the triac ideally lends itself to being the active switch element in an AC relay circuit.

However, the use of the triac as the active switch element in an AC relay circuit has not been without its problems. For example, it is well known that for most applications, it is desirable to have an AC relay, whether it is a circuit or an electromechanical device, which switches on only at those points in time when the value of the AC voltage being controlled is substantially equal to zero. This eliminates the transient problems which occur if the relay is switched on at an instant when the AC voltage being controlled has a substantial value.

A number of circuits have been devised in the prior art to provide zero voltage switching for AC relays using triacs as the active switch element. However, the triacs presently available require a signal of relatively large voltage and current (typically 3 volts and 300 milliamps) to trigger them into conduction, so the zero voltage switching circuits of the prior art have all had to provide some means of maintaining a signal at this level without actually applying it to the gate terminal of the triac until the next instant of time when the value of the AC voltage being controlled passes through zero. Typically, this has been done either by providing a control circuit which is controlled by the input circuit but which itself draws continuous current from its own power supply by providing additional silicon-controlled rectifiers to trigger the triac into conduction and controlling the silicon-controlled rectifiers by large energy storage components, such as inductors or capacitors, to trigger the silicon-controlled rectifier into conduction only at the right time when the applied voltage is substantially zero.

It is accordingly an object of the present invention to provide an improved AC relay circuit.

It is yet another object of the present invention to provide an improved AC relay circuit using a triac as the active switch element.

It is still another object of the present invention to provide an improved AC relay network using a triac as the active switch element which includes simple and inexpensive means for triggering the triac into conduction only when the value of the AC voltage being switched is substantially equal to zero.

Briefly stated, and in accordance with the presently preferred embodiment of the invention, an alternating current relay circuit is provided which includes a triac as its active switch element. The AC voltage to be controlled is applied to the primary terminals of the triac. The input terminals of a full wave rectifier are connected between one of the primary terminals and the gate terminal of the triac. A control switch, such as a conventional silicon-controlled rectifier, is connected between the load terminals of the full wave rectifier. Thus, whenever this switch is closed, sufficient current is drawn by the full wave rectifier through the gate terminal of the triac to trigger the triac into conduction. First control means are provided which are responsive to an input control signal for closing the control switch, thereby triggering the triac into conduction, and second control means are provided for rendering the control switch nonresponsive to the first control means whenever the magnitude of the AC voltage to be controlled exceeds a predetermined value, thereby preventing the triac from being switched into conduction except when the magnitude of the AC voltage to be controlled is less than this predetermined value.

For a complete understanding of the invention, together with an appreciation of other objects and advantages thereof, please refer to the attached drawing, in which the sole FIGURE shows a circuit diagram of an AC relay switch in accordance with the present invention.

The sole attached FIGURE shows a circuit diagram of an AC relay circuit in accordance with the present invention. As shown therein, the relay circuit includes a pair of output terminals 10 and 12 which are usually connected in series with the source of the AC voltage to be controlled and the load to which the voltage is to be applied. Neither the source of AC voltage nor the load are shown in the FIGURE, since the use of such a relay to connect these elements is well known to those skilled in the art. In its usual application, the function from the relay circuit is to provide an effectively open circuit between terminals 10 and 12 when the relay is not actuated, thereby preventing the application of the voltage to the load, and to provide an effectively short circuit between the terminals 10 and 12 when the relay is actuated, thereby allowing the AC voltage from the source to be connected through the relay circuit to the load.

The active switch element in the relay circuit is a triac 14, such as is described in U.S. Pat. No. 3,275,909. Triac 14 includes primary terminals 16 and 18 and a gate terminal 20. As is well known to those skilled in the art, triac 14 operates as though it were two conventional silicon-controlled rectifiers connected in opposite polarity and having their gate terminals tied together. Thus, when triggered into conduction, triac 14 can conduct current in either direction and it can be triggered into conduction by a signal of either polarity being applied to gate terminal 20. Again, as in the case of silicon-controlled rectifiers, once the triac 14 is conducting, the gate terminal 20 loses all control over its conduction, and conduction continues until the voltage impressed across primary terminals 16 and 18 is removed. It is noted that when a triac such as 14 is used in an AC circuit, the device is self extinguishing after each half cycle unless a triggering signal is maintained at the gate terminal 20, since the necessary principal voltage is effectively removed from the triac 14 each time the AC current passes through zero while reversing its polarity.

A full wave rectifier 22 is connected in series with a current-limiting resistor 23 between primary terminal 16 of triac 14 and gate terminal 20 of triac 14. The input terminals 24 and 26 of full wave rectifier 22 are connected as shown to effect this series circuit.

Connected between the load terminals 28 and 30 of full wave rectifier 22 is a control switch 32, which may be a conventional silicon-controlled rectifier whose anode terminal 34 is connected to the positive load terminal 28 and whose cathode terminal 36 is connected to the negative load terminal 30. A pair of terminals 40 and 42 are also shown which are connected respectively to the gate terminal 38 and the cathode terminal 36 of silicon-controlled rectifier 32.

The portion of the relay circuit described thus far operates in the following manner: Assume that triac 14 is not conducting. At this time essentially all of the AC voltage to be controlled appears across terminals 10 and 12. A series circuit exists between these terminals through resistor 23, full wave rectifier 22, the anode-cathode path of controlled rectifier 32 and the internal portion of triac 14 between gate terminal 20 and primary terminal 18. The effective resistance of this path is equal to the sum of the resistance of resistor 23, the anode-cathode resistance of controlled rectifier 32 and the gate-primary terminal resistance of triac 14. The value of resistor 23 and the characteristics of triac 14 and controlled rectifier 32 are selected such that the sum of these resistances limits the current flowing in gate terminal 20 to a value less than that required to trigger triac 14 into conduction. As was mentioned previously, triacs require a relatively high value of gating signal to be triggered into conduction.

Because of the use of the full wave rectifier 22, a positive voltage always exists between the anode 34 and cathode 36 of controlled rectifier 32, regardless of the polarity of the AC voltage applied to terminals 10 and 12. If a gating signal is applied through terminals 40 and 42 to the gate terminal 38 and cathode 36 of controlled rectifier 32, it is triggered into conduction and its internal resistance drops abruptly to a near zero value. At this time, the strength of the signal being applied to gate terminal 20 of triac 14, which signal is derived from the power being applied to terminals 10 and 12 by the AC voltage being controlled, not from the low level gating signal being applied through terminals 40 and 42, is limited only by current-limiting resistor 23 and the value of this resistor is selected so that the signal being applied to gate terminal 20 is easily sufficient to trigger triac 14 into conduction but is not sufficient to cause any internal damage to triac 14.

Triac 14 is now triggered into conduction, at which time gate terminal 20 loses control of the triac and the conduction continues until the half of the AC cycle is completed, at which time conduction through the triac is self extinguishing. However, if the gating signal is still being applied to gate terminal 38 of controlled rectifier 32 at the beginning of the subsequent half cycle of the AC voltage, triac 14 is again triggered into conduction for the following half cycle, and this pattern continues for as long as the gating signal remains on gate terminal 38.

As was mentioned previously, it is desirable to trigger triac 14 into conduction only when the value of the AC voltage appearing across terminals 10 and 12 is substantially equal to zero. In accordance with the present invention, this is effected in the following manner: A saturating transistor 44 is provided with its collector electrode connected to the gate terminal 38 of controlled rectifier 32 and with its emitter electrode connected to the cathode 36 of controlled rectifier 32. A voltage divider network comprising the three resistors 46, 48 and 50 connected in series is also connected between the load terminals 28 and 30 of full wave rectifier 22. These resistors are connected as shown, with resistor 50 connected directly between the base and emitter electrodes of transistor 44. The values of these resistors are chosen such that whenever the magnitude of the voltage being impressed across terminals 10 and 12 exceeds a predetermined value, a sufficient voltage drop appears across resistor 50 to bias transistor 44 into saturation, whereby an effective short circuit exists between the collector and emitter electrodes of transistor 44. For example, the values of the resistors 46, 48 and 50 may be chosen such that when the magnitude of the voltage appearing between terminals 10 and 12 exceed 6 volts of either polarity, due to the action of full wave rectifier 22, transistor 44 is biased into saturation. When transistor 44 is so saturated, it effectively shorts between the gate terminal 38 and cathode 36 of controlled rectifier 32, and if a gating signal is then applied between terminals 40 and 42, the signal is shorted through transistor 44 and does not trigger controlled rectifier 32 into conduction. In this manner, triac 14 is triggered into conduction by a gating signal appearing between terminals 40 and 42 only when the voltage being applied between terminals 10 and 12 is of a very small value less than the aforesaid predetermined value.

The manner in which the application of an input signal generates the gating signal to be applied to terminals 40 and 42 is as follows: An input or control signal whose application is to render the relay circuit operative is applied between input terminals 52 and 54, which are connected directly to a full wave bridge rectifier 56. A series circuit comprising a resistor 58 and diodes 60 and 62 is connected between the output terminals of full wave rectifier 56. A transistor 64 is provided whose base is connected between resistor 58 and diode 60 as shown, and whose emitter is connected through resistor 66 to the point between diode 62 and full wave rectifier 56.

The function of this portion of the input circuit is to convert the input or control signal into a DC current of constant value regardless of whether the input signal is an AC or a DC signal and regardless of the level of the input signal. This is affected in the following manner: If the input signal is AC it is rectified by full wave rectifier 56 and if it is DC of either polarity, it passes directly through full wave rectifier 56 and the input signal, rectified if necessary, appears across the series circuit of the resistor 58 and the diodes 60 and 62. Since the diodes 60 and 62 are poled in their forward direction, a constant voltage drop appears across these diodes regardless of the magnitude of the voltage applied between terminals 52 and 54, with the excess voltage appearing across resistor 58. This results in a constant voltage drop being applied across the series connection of the emitter-base junction of transistor 64 and resistor 66, since this series connection is in parallel with the diodes 60 and 62. This biases transistor 64 into a state of constant collector current, regardless of the level of the signal applied between terminals 52 and 54, with the magnitude of this constant collector current being a function of the value of resistor 66. This is because the diode 60 and the transistor 64 are selected such that the forward voltage drop across diode 60 is equal to the voltage drop across the emitter base junction of transistor 64. Thus, the voltage drop across resistor 66 must be equal to the constant forward voltage drop across diode 62, and this voltage drop is equal to the product of the emitter current of transistor 64 and the value of resistor 66. The value of this current thus must vary inversely with the value chosen for resistor 66, and by so selecting a desired value of resistor 66, a desired emitter current, and thus a desired constant collector current of transistor 64 can be achieved.

The collector current of transistor 64 is invented by a free running multivibrator comprising transistors 68 and 70, resistors 72 and 74, and center tap transformer 76, connected in the manner shown, which is itself a circuit well known to those skilled in the art. The operating parameters of the free-running multivibrator are selected such that its free-running frequency is at least 10 times higher than the frequency of the AC voltage to be controlled between terminals 10 and 12, in order to assure that a positive pulse out of the free-running multivibrator will occur during the time interval that the AC voltage being switched varies between zero and the above-mentioned predetermined level at which transistor 44 is biased into saturation, thereby effectively disabling controlled rectifier 32.

The input circuit as shown is completed by a filter section connected between the constant current transformer 64 and the free-running multivibrator which comprises the resistors 78 and 80 and the capacitor 82, together with the resistor 58, which was previously described.

The operation of the relay circuit may now be summarized as follows: An input control signal is applied between terminals 52 and 54, is rectified by full wave rectifier 56 and is converted into a constant current by transistor 64, whose output is applied through a filter section to be inverted by free-running multivibrator transistors 68 and 70. The high-frequency output signal of the multivibrator becomes the gating signal and is applied through terminals 40 and 42 to trigger controlled rectifier 32 into conduction. However, the saturating transistor 44 and the voltage divider network comprising the resistors 46, 48 and 50 prevent controlled rectifier 32 from being triggered into conduction if the instantaneous magnitude of the voltage being applied to terminals 10 and 12 exceeds a predetermined value. Assuming that a proper low-value voltage appears between terminals 10 and 12, the high-frequency gating signals applied between terminals 40 and 42 trigger controlled rectifier 32 into conduction, which in turn triggers triac 14 into conduction, thereby actuating the relay circuit. On the following half-cycle, triac 14 is self extinguishing, but if the input signal is still being applied between terminals 52 and 54, controlled rectifier 32 once again triggers triac 14 into conduction. The relay thus remains actuated until the input signal is removed from terminals 52 and 54.

The circuit as shown also includes certain filtering elements which were not mentioned in the above description of the circuit. For example, the series circuit of resistor 84 and capacitor 86 is also provided between output terminals 10 and 12. This forms a "snubber" network across the output to filter high-frequency line transients and to prevent them from falsely triggering triac 14. Also, capacitor 88 is provided in the base circuit of transistor 44 to provide a bypass for any high-voltage spikes which may occur across output terminals 10 and 12 to prevent them from saturating transistor 44 at a time wen it might be desired to trigger controlled rectifier 32 into conduction. Capacitor 90 is provided across the output terminals of transformer 76 in order to provide transient filtering for the gate terminal 38 of controlled rectifier 32 and also to stabilize the oscillator frequency of the free-running multivibrator. Capacitor 82, previously mentioned, also serves as a filter to prevent the high-frequency signals generated in the free-running multivibrator from returning back out the input terminals 52 and 54.

While the invention is thus disclosed and a particular embodiment thereof described in detail, it is not intended that the invention be limited solely to this disclosed embodiment. Instead, many modifications will occur to those skilled in the art which lie within the spirit and scope of the invention. For example, a particular input circuit has been shown for providing a desired gating signal to the gate terminal 38 of controlled rectifier 32. Any desired input circuit could be used instead to so apply the gating signal. It is thus intended the invention be limited in scope only by the appended claims.

What is claimed is:

1. An alternating current relay circuit comprising, in combination:
   a. a triac having first and second primary terminals and a gate terminal;
   b. means for applying an AC voltage to be controlled to said primary terminals;
   c. a full wave rectifier having input terminals and positive and negative load terminals, said input terminals being connected between one of said primary terminals and said gate terminal of said triac;
   d. a control switch connected between said load terminals of said full wave rectifier;
   e. first control means responsive to a control signal for closing said control switch, thereby triggering said triac into condition; and
   f. second control means for rendering said control switch nonresponsive to said first control means whenever the magnitude of said AC voltage to be controlled exceeds a predetermined value.

2. The relay circuit of claim 1 in which said control switch comprises a controlled rectifier having an anode, a cathode and a gate terminal, said anode being connected to said positive load terminal of said full wave rectifier and said cathode being connected to said negative load terminal of said full wave rectifier and in which said first control means comprises means for applying a control signal to said relay circuit and means responsive to the application of said control signal to said relay circuit for applying a gating signal to said gate terminal of said controlled rectifier.

3. The relay circuit of claim 2 in which said second control means comprises a saturable transistor connected between said gate terminal and said cathode of said controlled rectifier and third control means for driving said transistor into saturation whenever the magnitude of said AC voltage to be controlled exceeds said predetermined value.

4. The relay circuit of claim 3 in which said third control means comprises a voltage divider connected between said load terminals of said full wave rectifier.

5. The relay circuit of claim 4 which further includes a current limiting resistor connected in series with one of said input terminals of said full wave rectifier.

6. The relay circuit of claim 4 in which said first control means further includes means responsive to the application of said control signal to said relay circuit for generating an AC gating signal having a frequency at least 10 times higher than the frequency of said AC voltage to be controlled and means for applying said AC gating signal between gate terminal and said cathode of said controlled rectifier.

7. The relay circuit of claim 6 in which said first control means further includes constant current means responsive to the application of said control signal to said relay circuit for developing a constant current signal and means for inverting said constant current signal into said AC gating signal.

8. The relay circuit of claim 7 in which said constant current means comprises a series circuit of a resistor and a diode, means for applying said control signal to said series circuit, whereby a constant forward voltage drop is developed across said diode whenever said control signal is applied, regardless of the value of said control signal, a transistor having a collector electrode, a base electrode and a emitter electrode, means connecting said base electrode and said emitter electrode across said diode, thereby causing a constant base current in said transistor whenever said control signal is applied, thereby causing the collector current in said transistor to be of a constant value whenever said control signal is applied.

9. The relay circuit of claim 8 which further includes a rectifier connected between said means for applying a control signal to said relay circuit and said series circuit of said resistor and said diode, whereby said constant forward voltage drop is developed across said diode regardless of whether said control signal is DC or AC.

10. The relay circuit of claim 9 which further includes a current-limiting resistor connected in series between said full wave rectifier and said one of said primary terminals of said triac.

\* \* \* \* \*